United States Patent [19]

Holland

[11] Patent Number: 4,539,818
[45] Date of Patent: Sep. 10, 1985

[54] REFRIGERATOR WITH A CLEARANCE SEAL COMPRESSOR

[75] Inventor: Noel J. Holland, Burlington, Mass.

[73] Assignee: Helix Technology Corporation, Waltham, Mass.

[21] Appl. No.: 653,486

[22] Filed: Sep. 21, 1984

Related U.S. Application Data

[63] Continuation of Ser. No. 487,513, Apr. 22, 1983, abandoned, which is a continuation-in-part of Ser. No. 308,530, Oct. 5, 1981, abandoned, which is a continuation of Ser. No. 181,152, Aug. 25, 1980, abandoned.

[51] Int. Cl.³ .............................................. F25B 9/00
[52] U.S. Cl. .............................................. 62/6; 60/520
[58] Field of Search ................................ 62/6; 60/520

[56] References Cited

U.S. PATENT DOCUMENTS

| | | | |
|---|---|---|---|
| 3,211,108 | 10/1965 | Mandorf, Jr. et al. | 103/216 |
| 3,333,543 | 8/1967 | Albaut | 192/170 |
| 3,364,675 | 1/1968 | Dorer | 62/6 |
| 3,861,146 | 1/1975 | Lynch et al. | 60/524 |
| 3,928,974 | 12/1975 | Benson | 60/650 |
| 3,958,841 | 5/1976 | Braun | 208/3.5 |
| 4,029,000 | 6/1977 | Nakamura et al. | 92/170 |
| 4,044,558 | 8/1977 | Benson | 60/520 |
| 4,058,382 | 11/1977 | Mulder | 62/6 |
| 4,156,584 | 5/1979 | Schuck | 192/162 R |
| 4,189,984 | 2/1980 | Tankred et al. | 192/82 |
| 4,277,948 | 7/1981 | Horn et al. | 62/6 |

FOREIGN PATENT DOCUMENTS

| | | | |
|---|---|---|---|
| 524036 | 1/1940 | United Kingdom . | |
| 643435 | 9/1950 | United Kingdom . | |
| 771334 | 3/1957 | United Kingdom . | |
| 1350082 | 4/1974 | United Kingdom | 92/192 R |
| 2057091 | 3/1981 | United Kingdom . | |
| 545805 | 7/1980 | U.S.S.R. . | |

OTHER PUBLICATIONS

Collins, S. C., "A Helium Cryostat", *Rev. of Sc. Instr.*, vol. 18, No. 3, Mar. 1947, pp. 157–167.
Ferreira, L. E. and D. D. Briggs, "Aluminum Oxide and Beryllium Oxide Ceramics—Seal Materials of the Future", Coors Porcelain Co., No. 650303, pp. 153–155.
Kapitza, P., "The Liquefaction of Helium by an Adiabatic Method", Proc. Royal Soc. A147, 189 (1934).
Smirnov, E. N. and V. I. Epifanova, "Calculation of the Coefficient of Delivery for a High Pressure Cryogen--Liquid Pump with Sealing Clearance", Chem. Petrol. Eng. N, Sep.–Oct. 1969, pp. 680–683.
"Engineering Ceramics", Engineering Materials and Design, Aug. 1977, pp. 19–20.
Coors Porcelain Company, Bulletin No. 953, "Coors Ceramics—Materials for Tough Jobs".
Longsworth, Ralph C., "Split Stirling Cycle Cryogenic Refrigerator", Final Technical Report of Air Products and Chemicals, Inc., Feb. 1974.
Jaeger, Gene, D. Bucklet, R. Robbins, C. Fountain, G. L. Holladay, W. R. Compton, "Fiscal Year 1980 Split Stirling Cryogenic Cooler Technology Bid and Proposal Effort", NWC Technical Memorandum 4476, Dec. 1981.

(List continued on next page.)

*Primary Examiner*—Ronald C. Capossela
*Attorney, Agent, or Firm*—Hamilton, Brook, Smith & Reynolds

[57] ABSTRACT

In a Stirling refrigeration system in which a displacer is driven in a reciprocating motion within a cold finger by a pressure differential between helium gas in the cold finger and helium gas in a gas spring volume, the reciprocating piston compressor for the working volume has a clearance seal between the working volume and a control volume. The only lubricant in that seal is the helium gas. The mean pressure of the working volume relative to the control volume can be controlled by varying the length of the clearance seal throughout the stroke of the piston. Preferably, the seal is between alumina ceramic sleeves. The clearance seal compressor may also be used in a Gifford-McMahon cycle.

15 Claims, 9 Drawing Figures

OTHER PUBLICATIONS

Night Vision Laboratory and Texas Instruments Inc. Final Engineering Report, "Design and Development of a Miniature Split Stirling Refrigerator", Apr. 1976.

Breckenridge, Jr., R. W., et al., "Development of Rotary-Reciprocating Cryogenic Refrigerator for Space Applications", Technical Report of Arthur D. Little, Inc., Jul. 1972.

Studar, Philip A. and Max G. Gasser, "A Bi-Directional Linear Motor/Generator with Integral Magnetic Bearings for Long Lifetime Stirling Cycle Refrigerators", Space Technology Div., Goddard Space Flight Center, Greenbelt, Md., pp. 146-153.

Haarhius, G. J., "The MC—A Magnetically Driven Stirling Refrigerator", *Cryogenics*, Dec. 1978, pp. 656-658.

Curwen, Peter W., "Design and Test of a Helium Gas Spring", Mechanical Technology Inc., Report prepared for Office of Naval Research, May 10, 1974.

REFRIGERATOR WITH A CLEARANCE SEAL COMPRESSOR

This is a continuation of U.S. Ser. No. 487,513 filed Apr. 22, 1983 now abandoned; which is a continuation-in-part of U.S. Ser. No. 308,530 filed Oct. 5, 1981; now abandoned; which is a continuation-in-part of U.S. Ser. No. 181,152 filed Aug. 25, 1980 now abandoned.

FIELD OF THE INVENTION

This invention relates to refrigeration systems and particularly to reciprocating compressors used in such systems.

BACKGROUND

A Stirling cryogenic refrigeration system includes a reciprocating compressor which provides a sinusoidal variation in pressure in a working volume of gas. The working volume includes the head space above the compressor piston and the internal voids in a refrigerator cold finger. In the case of a split Stirling system, the working volume also includes a gas line interconnecting the above spaces. Within the cold finger, a displacer moves in timed relationship with the sinusoidal pressure variations to provide cooling at one end of the cold finger.

The usual Stirling cycle includes an electric motor driven compressor, and the invention will be described with reference to a split Stirling cycle of that type. The invention is also applicable to Gifford-McMahon type refrigerators such as disclosed in U.S. Pat. Nos. 2,906,101 to McMahon et al. and 2,966,035 to Gifford in which pressure control valves are positioned between the compressor and the cold finger.

Generally, the fluid seal about the compressor piston is an annular lip or split ring seal. One problem encountered in Stirling systems results from the fact that there is always some leakage past the dynamic seal between the reciprocating compressor piston and its cylinder. The leakage is between the working volume and a control volume on the opposite side of the piston. Where there is a greater leakage in one direction than in the other with movement of the piston, the mean value of the pressure in the working volume of gas tends to be above or below the mean pressure of the control volume. If the direction or magnitude of that leakage changes during the life of the refrigerator, the refrigerator suffers a change in the pressure wave for which the cold finger and displacer were designed. The result is a significant drop in the efficiency and capacity of the device.

An object of this invention is to provide a Stirling refrigeration system, and a compressor for use therein, wherein the mean value and the peak to peak differential of the sinusoidal pressure variations in the compressed working volume of gas is stabilized for a long refrigerator life.

A problem common to both Stirling and Gifford-McMahon refrigerators is that, with wear, particles from the compressor seals contaminate the helium refrigerant. Those contaminants result in a significant degradation of performance and shorten the operating life of the refrigerator.

A further object of this invention is to provide a refrigeration system having a longer life than prior systems due to lesser wear to the compressor section of the refrigerator.

DISCLOSURE OF THE INVENTION

In a refrigeration system in which the gas in a working volume is compressed by a compressor piston, the fluid seal between the ends of the compressor piston is a low friction clearance seal between a hard smooth piston wall and a hard smooth cylinder wall. Preferably the piston and cylinder walls are of alumina ceramic. With no lubricant between the two walls and with virtually no debris worn from the walls over hundreds of hours of operation, the refrigerating gas is not subject to contamination from the compressor. Also, there is so little wear to the clearance seal that the pressure wave in the working volume undergoes only minimal changes over hundreds of hours of operation.

The mean pressure in the working volume can be held above or below the mean pressure in the control volume by structuring the compressor piston and cylinder such that the length of the clearance seal varies through the piston stroke. To provide a relatively high mean pressure in the working volume the clearance seal has its maximum length when the pressure in the working volume is at its peak. The length of the seal can be varied by providing a cylinder which is sufficiently short that the piston extends beyond the cylinder at one end of its stroke.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
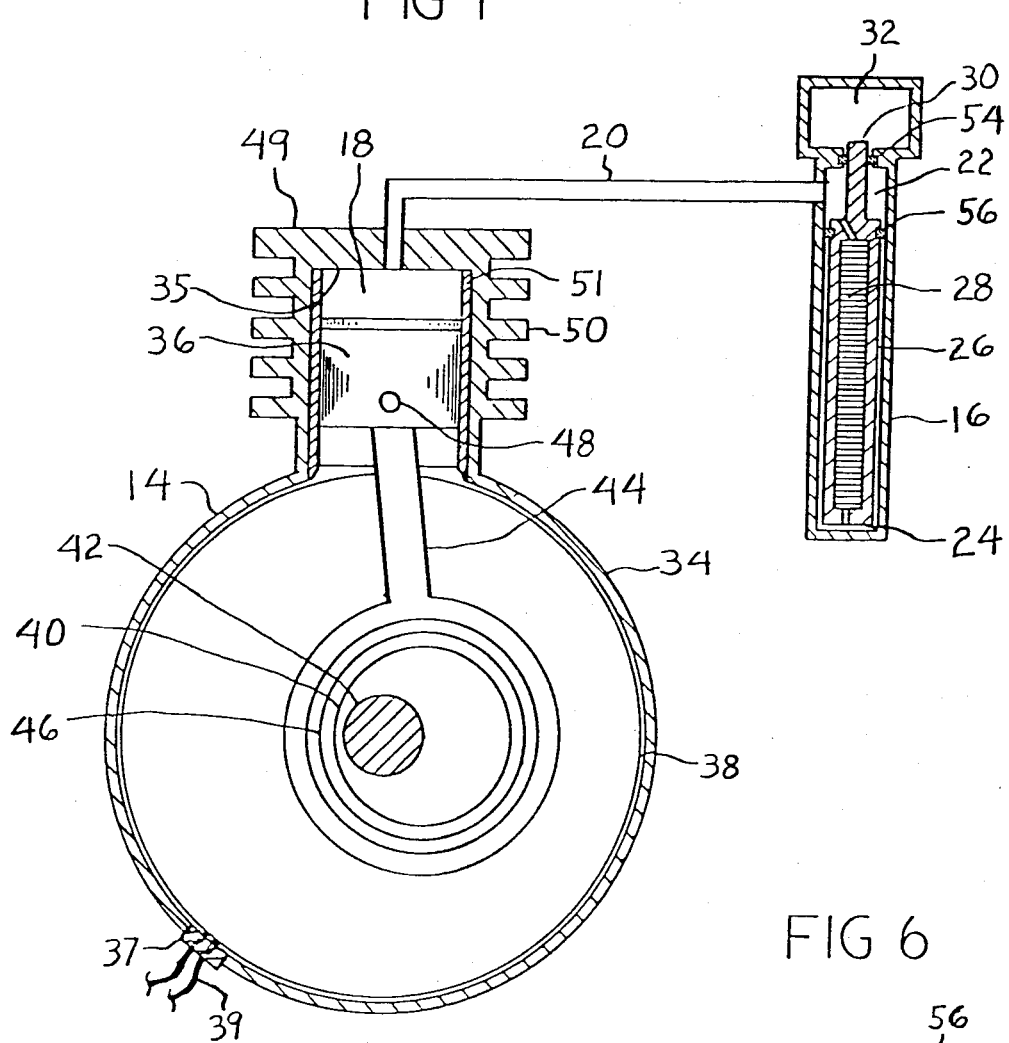
FIG. 1 is a schematic of a split Stirling refrigerator system embodying the present invention.

A split Stirling refrigeration system 12 is shown in FIG. 1. This system includes a reciprocating compressor 14 and a cold finger 16. The compressor provides a sinusoidal pressure variation in a pressurized refrigeration gas in the head space 18. That pressure variation is transmitted through a helium supply line 20 to the cold finger 16.

Within the cylinder of the cold finger 16 a cylindrical displacer, a piston element 26, is free to move upward and downward to change the volumes of the warm space 22 and the cold space 24 within the cold finger. The displacer 26 houses a regenerative heat exchanger 28 comprised of several hundred finemesh copper screen discs stacked to form a cylindrical matrix. Other regenerators, such as those with stacked balls, are also known. Helium is free to flow through the regenerator between the warm space 22 and the cold space 24. As will be discussed below, a piston element 30 extends upward from the displacer 26 into a gas spring volume 32 at the warm end of the cold finger.

The compressor 14 includes a gas tight housing 34 which encloses a reciprocating piston pump element 36 driven through a crank mechanism from an electrical motor 38. The crank mechanism includes a crank cam 40 fixed to the motor drive shaft 42. A connecting arm 44 is driven by the cam through a bearing 46 which may be two close fitting ceramic sleeves. The arm 44 in turn drives the piston 36 through a wrist pin 48. Electrical power is provided to the motor 38 from electrical leads 39 through a fused ceramic feedthrough connector 37.

Heat of compression and heat generated by losses in the motor are rejected to ambient air by thermal conduction through the fins 50 surrounding the compressor cylinder.

The refrigeration system of FIG. 1 can be seen as including three isolated volumes of pressurized gas. The crankcase housing 34 is hermetically sealed to maintain a control volume of pressurized gas within the crankcase below the piston 36. The piston 36 acts on that control volume as well as on a working volume of gas. The working volume of gas comprises the gas in the space 18 at the upper end of the compressor cylinder 35, the gas in the supply line 20, and the gas in the spaces 22 and 24 and in the regenerator 28 of the cold finger 16. The third volume of gas is the gas spring volume 32 which is sealed from the working volume by a piston seal 54 surrounding the drive piston 30. A conventional piston seal is shown but a more preferred seal arrangement is described in my copending U.S. patent application Ser. No. 135,141 now abandoned, filed Mar. 28, 1980.

As shown in copending application Ser. No. 135,141 now abandoned, each of the seals 54 and 56 in the cold end of the refrigerator is a clearance seal comprising ceramic. Thus, all seals communicating with the working volume, that is the clearance seal about the compressor piston, the seal 56 within the working volume, and the seal 54 between the working volume and the spring volume, are clearance seals comprising ceramic and debris in the working volume is minimized.

Operation of the split Stirling refrigeration system of FIG. 1 can be best understood with reference to FIGS. 2–5. At the point in the cycle shown in FIG. 2, the displacer 26 is at the cold end of the cold finger 16 and the compressor is compressing the gas in the working volume. This compressing movement of the compressor piston 36 causes the pressure $P_w$ in the working volume to rise from the minimum pressure to a maximum pressure. The pressure in the gas spring volume 32 is stabilized at some level between the minimum and maximum pressure levels of the working volume. Thus, at some point the increasing pressure in the working volume creates a sufficient pressure difference across the drive piston 30 to overcome the friction of displacer seal 56 and drive seal 54. The piston and displacer then move rapidly upward to the position of FIG. 3. With this movement of the displacer, high-pressure working gas at ambient temperature is forced through the regenerator 28 into the cold space 24. The regenerator absorbs heat from the flowing pressurized gas and reduces that gas to cryogenic temperature.

Figure 4:
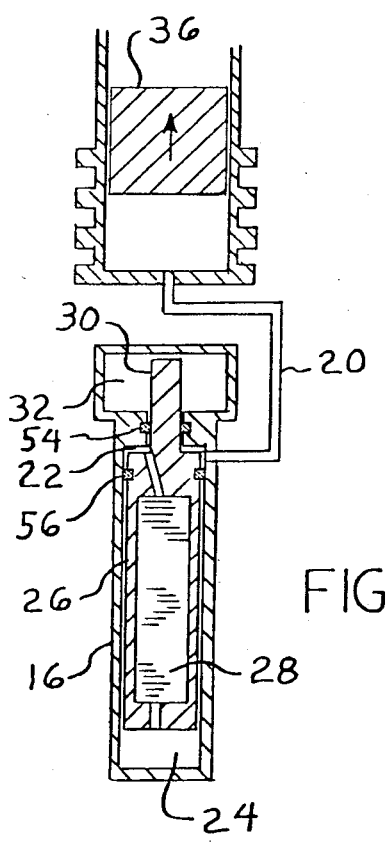
Figure 5:
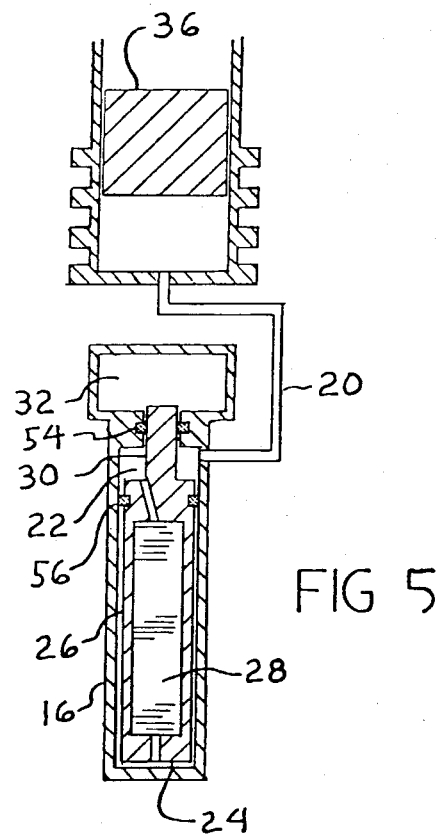

With the sinusoidal drive from the crank shaft mechanism, the compressor piston 36 now begins to expand the working volume as shown in FIG. 4. With expansion, the high pressure helium in the cold space 24 is cooled even further. It is this cooling in the cold space 24 which provides the refrigeration for maintaining a temperature gradient of over 200° K. over the length of the regenerator.

At some point in the expanding movement of the piston 36, the pressure in the working volume drops sufficiently below that in the gas spring volume 32 for the gas pressure differential to overcome seal friction. The piston 30 and the displacer 26 are then driven downwardly to the position of FIG. 5, which is also the starting position of FIG. 2. The cooled gas in the cold space 24 is thus driven through the regenerator to extract heat from the regenerator.

It should be understood that, as is well known in the art, stroke control means may be provided to assure that the displacer does not strike either end of the cold finger cylinder. Such control means may include one way valves and ports suitably located in the drive piston 30.

Figure 7A:
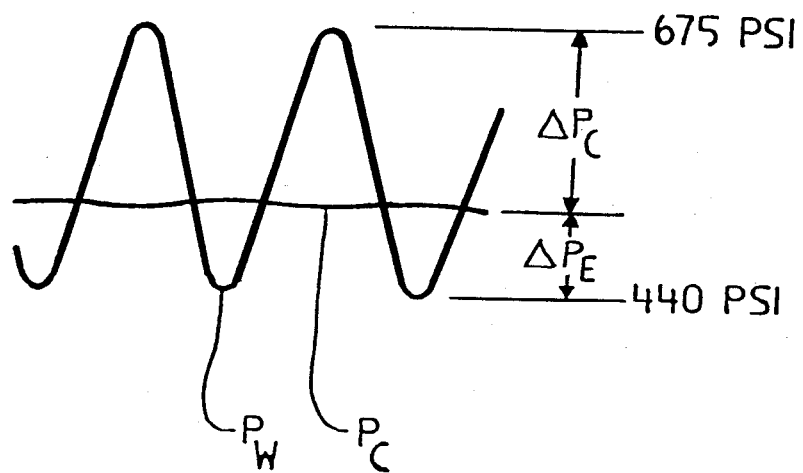
FIGS. 7A-7C are graphical illustrations of the working pressure and the control pressure in the compressor of FIG. 1 at three points in the operating life of the compressor.

Attention is now directed to operation of the compressor piston seal. The respective pressures $P_w$ and $p_c$ in the working volume and control volume follow sinusoidal curves 180° out of phase. Because the control volume is much larger than the working volume, movement of the piston 36 has a lesser effect on pressure in that volume, as illustrated in FIG. 7A. At the end of the compression stroke in compressing the working volume, there exists a pressure differential $\Delta P_C$ across the seal. At the end of the expansion stroke in expanding the working volume, there exists a pressure differential $\Delta P_E$.

Now consider the situation in which the compressor piston seal tends to have greater leakage in one direction than in another. For example, due to the nature of the seal, a pressure differential $\Delta P_C$ at the compression end of the piston stroke might result in the same leakage as a greater pressure diffential $\Delta P_E$ at the expansion end of the stroke. The working pressure and the control pressure tend to stabilize to different mean pressures which equalize the gas leakage. For example, they might stabilize to the condition shown in FIG. 7A.

On the other hand, if equal pressure differentials $\Delta P_C$ and $\Delta P_E$ resulted in equal gas leakage in the two directions past the seal, the system would stabilize to a condition where the mean pressures in the control and working volumes are equal.

If a refrigeration system could be expected to stabilize with a constant mean value and peak-to-peak differential in the working volume pressure, the system could be designed to operate in that condition efficiently. For example, if it were known that the maximum pressure of the working volume would always be about equal to the mean pressure of the control volume, the control volume pressure could be set sufficiently high to draw the working pressure to the desired level.

Also, the structural elements within the system could be economically designed to meet the maximum stresses. For example, the connecting rod 44 would have to withstand high compressive forces if the refrigeration system operated with a high working volume pressure relative to the control volume pressure. On the other hand, high tensile stresses must be met if the system operates with a relatively low working volume pressure.

A major problem of most conventional seal arrangements for the compressor is that with wear of the seal the leakage in the two directions past the seal changes in magnitude. As a result, the pressure wave in the working volume is not stable through a sufficiently long life of the compressor. When the pressure becomes unstable due to seal wear the efficiency and capacity of the refrigerator are greatly reduced. Further, wear of the seal may result in debris which contaminates the refrigerant such as helium gas.

Figure 6:
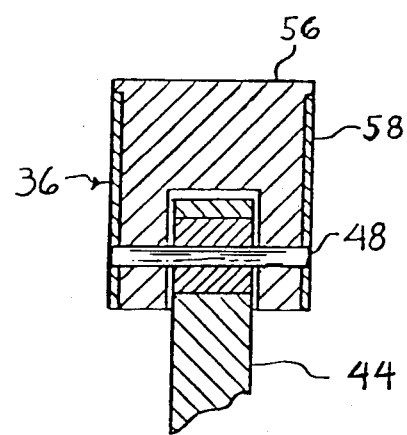
FIG. 6 is a cross-sectional view of the compressor piston of FIG. 1.
Figure 2:
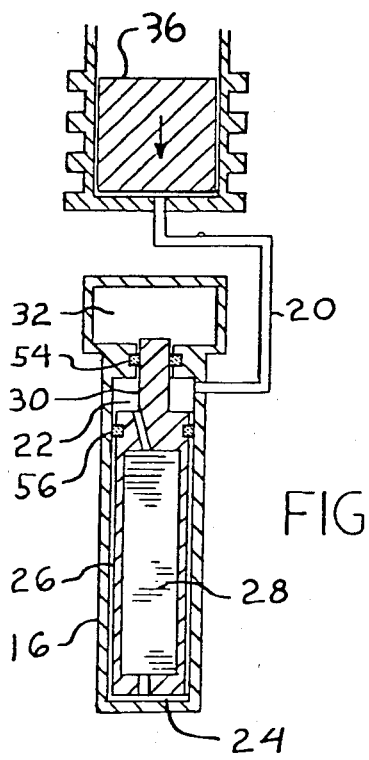
FIGS. 2-5 are simplified schematics of the system of FIG. 1 illustrating four steps in the refrigeration cycle.
Figure 3:
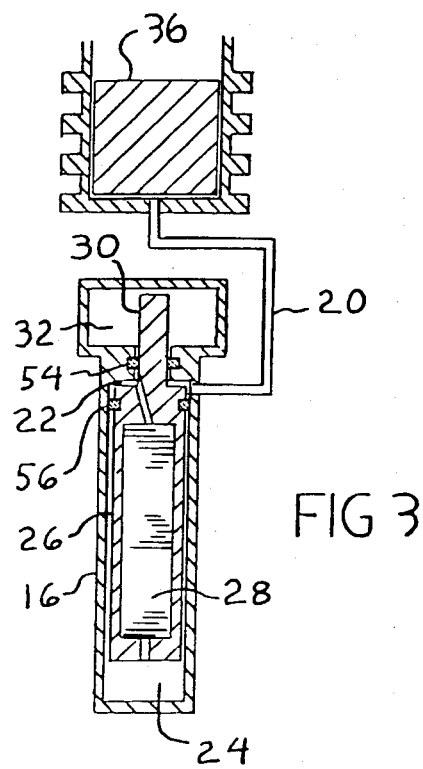

As shown in FIGS. 1 and 6, the fluid seal between the two ends of the compressor piston 36 is a lubricant free clearance seal. The use of a lubricant should be avoided to avoid contamination of the helium refrigerant. In effect, the gas refrigerant fills the small gap between the piston and cylinder walls to provide gas lubrication.

To provide for low friction movement of the piston within the cylinder and to minimize wear to the clearance seal surfaces, it is imperative that those surfaces be of very hard, smooth material. The hardness of those surfaces should be at least 60 on the Rockwell C scale and is preferably over 70 on the C scale. The abrasion resistance should be such that the wear rate of the two close fitting moving parts is less than about one microinch per hour. With respect to smoothness, the finish should be better than 16 microinches.

The clearance seal elements, a piston sleeve 58 and a cylinder sleeve 51, are made of ceramic, cermet, hardened steel, or other hard, abrasion resistant material. Cermets are materials comprising processed ceramic particles bonded with metal and used in high strength, abrasion resistant applications. Materials comprising ceramic are particularly suited for use in forming the clearance seal because ceramic does not suffer from the problem of galling, a welding action, that might result from the use of metal clearance seal surfaces. Ceramics include compounds of any of the metals or metal-like materials in groups II, III or IV of the periodic table combined with a non-metal, typically oxygen, nitrogen, sulfur, carbon, boron or silicon. Ceramics are characterized by being hard and abrasion resistant. Examples of such ceramics are aluminum oxide (alumina), beryllium oxide (beryllia), titanium dioxide, titanium diboride, boron carbide, silicon nitride and pyrolytic graphite. Other substances may be added to a ceramic to improve its characteristics. Alumina ($Al_2O_3$) is a preferred ceramic material; and titanium carbide mixed with alloy steels such as that sold under the registered trademark Ferro-Tic, is a preferred cermet. Although the piston and cylinder need not be solid ceramic or cermet, at least a bulk layer of ceramic should be provided on each of the piston and cylinder at the clearance seal to assure that these elements display the bulk characteristics of the ceramic.

For optimum performance of a 0.5620 inch diameter, 0.3755 inch long compressor piston, the radial clearance of the clearance seal has been calculated to be 0.00010 inches. A clearance within the range of 0.00006 inches to 0.00015 inches will also provide satisfactory results. A gap in the order of 0.00010 inch, as high as about 0.00050 inch, is believed to be sufficiently small.

To provide for heat dissipation from the compressor, the compressor casing 49 is of a high conductivity aluminum. A ceramic sleeve 51 is positioned within the casing 49 to provide the hard, smooth cylinder wall required for the clearance seal. In this case the sleeve is bonded to the casing by crimping the casing over the end of the sleeve. The sleeve 51 has a thickness of 0.069 inches.

The ceramic 51 has a fairly low coefficient of thermal expansion, about $7 \times 10^{-6}/°$ C. The aluminum, however, has a coefficient of expansion of about three times that amount. But because of the high compressive strength of the ceramic, contraction and expansion of the aluminum casing 49 has virtually no effect on the inner diameter of the sleeve.

To reduce fabrication and material costs, the piston head 36 comprises a steel insert 56 within a ceramic sleeve 58. Because the ceramic does not have high tensile strength, the material of the insert has been selected to provide a close match between the coefficients of thermal expansion of the insert and sleeve. Stainless steel having a coefficient of thermal expansion of about 50% greater than the ceramic has been chosen. This sleeve is epoxied to the piston and that epoxy provides a cushion for some differential in the expansion or contraction of the sleeve and insert. The sleeve 58 has a thickness of 0.040 inches.

Figure 7B:
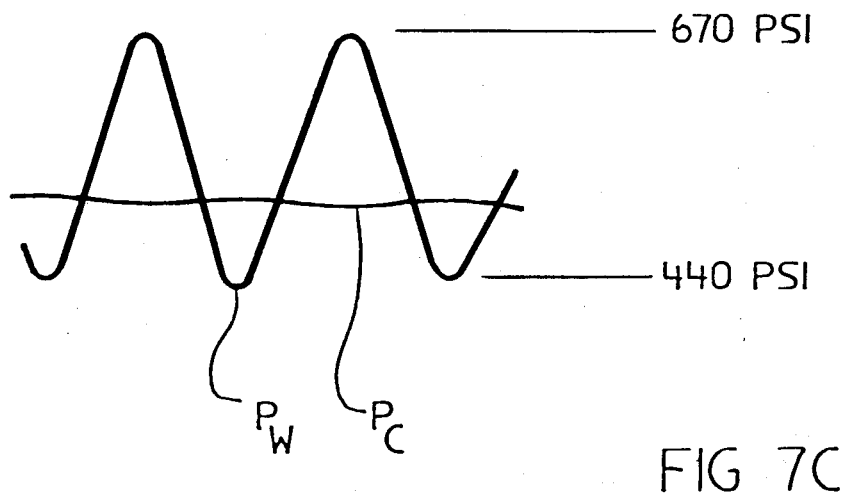
Figure 7C:
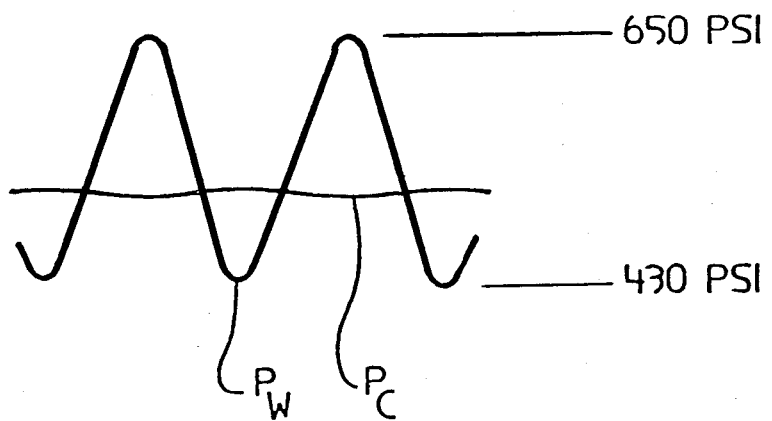

The compressor shown in FIGS. 1 and 6 was used with a dummy working volume in tests which provided the results shown in FIGS. 7A–7C. The compressor was run for 1,000 hours primarily at 20° C. Within that thousand hours, the compressor was also run for 32 hours at 55° C. and 17.5 hours at −54° C. After 515 hours, an unusually long operating period in itself, the epoxy holding the ceramic sleeve 54 failed and that sleeve was replaced. The original piston configuration was used throughout the test.

The compressor pressure waves after 30 hours, 490 hours, and 878 hours are shown in respective drawings in FIG. 7. With a crankcase pressure of 515 psig the initial pressure wave of the compressor ranged from 440 psig to 675 psig. The clearance of the clearance seal at that point was 0.00006 inches. After 490 operating hours (FIG. 7B) the clearance was still 0.00006 inches and the pressure range was from 440 psig to 670 psig. Finally, after 878 hours (FIG. 7C), the clearance was 0.00015 inches and the pressure range was 430 psig to 650 psig.

It can be seen in each of FIGS. 7A–7C that the mean value of the pressure in the working volume was slightly greater than the mean pressure in the crankcase volume. It is believed that this higher pressure in the working volume resulted from the fact that the lower end of the piston 36 dropped below the compressor cylinder at the lower end of its stroke. At that point the length of the clearance seal was less than it was at the opposite end of the stroke. Thus, the seal length was at its minimum when the crankcase volume was in compression. There was a resultant tendency for greater leakage from the crankcase volume to the working volume at the lower end of the stroke than from the working volume to the crankcase volume at the upper end of the stroke. This resulted in a pumping up of the working volume pressure to the stable situation shown in FIGS. 7.

It can be seen in FIG. 1 that the inside surface of the sleeve 51 is beveled toward its lower end. This bevel increases the gap between the two sleeves at the lower end of the cylinder and provides for the varying seal length through the stroke of the piston.

While the invention has been particularly shown and described with reference to preferred embodiments thereof, it will be understood by those skilled in the art that various changes in form and details may be made therein without departing from the spirit and scope of the invention as defined by the appended claims.

I claim:

1. A helium cryogenic refrigerator of the type comprising a reciprocating displacer within a refrigerator cylinder, the displacer being driven in a reciprocating motion by the pressure differential across a fluid seal between helium gas in the refrigerator cylinder and gas in a gas spring volume, the refrigerator cylinder being in fluid communication with a compressor space in a compressor cylinder, the compressor space and the refrigerator cylinder defining a closed working volume of helium gas which is compressed and expanded by a piston in the compressor cylinder which is driven by a rotary motor through a crank mechanism in a sealed crankcase, the only fluid seal between a control volume in the crankcase at one end of the compressor piston and the working volume at the other end of the compressor piston and every other fluid seal in communication with the working volume being a low friction extended clearance seal between a hard, smooth piston wall and a hard, smooth cylinder wall, the hardness of each of the piston wall and the cylinder wall surfaces being at least about 60 on the Rockwell C scale, at least one of the piston and cylinder walls comprising ceramic.

2. A refrigerator as claimed in claim 1 wherein the radial clearance of the clearance seal is in the order of 0.00010 inches.

3. A refrigerator as claimed in claim 1 wherein the length of the clearance seal varies through the stroke of the compressor piston to provide a mean pressure within the working volume different from that at the opposite end of the piston.

4. A refrigerator as claimed in claim 3 wherein the clearance seal has its longest length when the working volume is at its highest pressure.

5. A refrigerator as claimed in claim 3 wherein the cylinder wall is shaped to provide a greater space between the cylinder and piston at the end of the piston opposite to the working volume.

6. A refrigerator as claimed in claim 5 wherein the cylinder is beveled.

7. A refrigerator as claimed in claim 1 wherein the ceramic is alumina.

8. A refrigerator as claimed in claim 1 wherein the clearance seal is between ceramic sleeves respectively surrounding and within a metal core and metal casing.

9. A helium cryogenic refrigerator of the type comprising a refrigerator cylinder, a reciprocating element within the refrigerator cylinder for expanding and thus cooling helium gas therein, and a compressor including a compressor piston within a compresor cylinder which is driven by a rotary motor through a crank mechanism in a sealed crankcase for compressing a working volume of helium gas to be expanded in the refrigerator cylinder, the compressor piston being guided by the compressor cylinder against radial movement in its reciprocating movement within the cylinder and there being a seal against helium gas flow between a control volume in the crankcase at one end of the compressor piston and the working volume at the other end of the compressor piston, the improvement wherein the only gas seal between the ends of the compressor piston is a low friction, extended clearance seal having a radial gap of about 0.00010 inch between a hard, smooth piston wall and a hard, smooth cylinder wall which serve as piston bearing surfaces, the hardness of each of the piston wall and the cylinder wall surfaces being at least about 60 on the Rockwell C scale, at least one of the piston and cylinder walls comprising ceramic.

10. A refrigerator as claimed in claim 9 wherein the compressor piston and cylinder walls comprise ceramic material.

11. A refrigerator as claimed in claim 10 wherein the ceramic is alumina.

12. A refrigerator as claimed in claim 9 wherein the compressor cylinder wall or piston wall comprises ceramic.

13. A helium cryogenic refrigerator of the type comprising a refrigerator cylinder, a reciprocating element within the refrigerator cylinder for expanding and thus cooling helium gas therein, and a compressor including a compressor piston within a compressor cylinder and driven by a rotary motor through a crank mechanism in a sealed crankcase for compressing a working volume of helium gas to be expanded in the refrigerator cylinder, the crankcase volume being substantially greater than the working volume and there being a seal against helium gas flow between the ends of the compressor piston, the improvement wherein the only gas seal between a control volume in the crankcase at one end of the compressor piston and the working volume at the other end of the compressor piston is a low friction, extended clearance seal between a hard, smooth piston wall and a hard, smooth cylinder wall which serve as piston bearing surfaces, at least one of the piston and cylinder walls comprising ceramic.

14. A helium cryogenic refrigerator as claimed in claim 13 wherein the hardness of the surface of each of the piston wall and cylinder wall is at least 60 on the Rockwell C scale and the radial clearance between the piston wall and cylinder wall is about 0.00010 inch.

15. A helium cryogenic refrigerator as claimed in claim 14 wherein both the piston wall and the cylinder wall comprise ceramic.

* * * * *